(12) United States Patent
Oshima et al.

(10) Patent No.: US 6,523,224 B1
(45) Date of Patent: Feb. 25, 2003

(54) HINGE ASSEMBLY WITH LIMITED PLAY

(75) Inventors: Kazuyoshi Oshima, Naruto-machi (JP); Katsuya Imai, Tako-machi (JP)

(73) Assignee: Sugatsune Kogyo Co., Ltd. (JP)

( * ) Notice: Subject to any disclaimer, the term of this patent is extended or adjusted under 35 U.S.C. 154(b) by 0 days.

(21) Appl. No.: 09/625,535

(22) Filed: Jul. 26, 2000

(30) Foreign Application Priority Data

| Aug. 6, 1999 | (JP) | ............................................ 11-223547 |
| Aug. 18, 1999 | (JP) | ........................................ 11-231356 |
| Apr. 24, 2000 | (JP) | ...................................... 2000-122229 |

(51) Int. Cl.[7] ............................................. B60B 33/06
(52) U.S. Cl. ............................. 16/335; 16/336; 16/342; 296/97.12
(58) Field of Search .......................... 16/335, 232, 231, 16/334, 333, 336, 342, 341, 296, 330; 296/97.12, 97.13; 248/291

(56) References Cited

U.S. PATENT DOCUMENTS

| 4,785,500 A | * | 11/1988 | Langridge |
| 5,251,949 A | * | 10/1993 | Miller et al. |
| 5,364,149 A | * | 11/1994 | Aymerich et al. |
| 5,918,348 A | * | 7/1999 | Carpemter et al. |
| 6,035,491 A | * | 3/2000 | Hartigan et al. |
| 6,085,387 A | | 7/2000 | Han ............................ 16/330 |
| 6,119,310 A | * | 9/2000 | Ohshima et al. |
| 6,209,173 B1 | * | 4/2001 | Salter et al. |

FOREIGN PATENT DOCUMENTS

| EP | 0732474 A1 | 9/1996 |
| GB | 811591 | 9/1957 |
| GB | 1417617 | 3/1973 |
| GB | 2187228 A | 11/1985 |
| GB | 2300881 A | 5/1996 |
| GB | 2322906 A | 12/1996 |
| JP | 09-093317 | 4/1997 |
| JP | 09-284165 | 10/1997 |
| JP | 2766074 | 6/1998 |
| JP | 2906346 | 6/1999 |

* cited by examiner

*Primary Examiner*—Anthony Knight
*Assistant Examiner*—Mark Williams
(74) *Attorney, Agent, or Firm*—Eugene Stephens & Associates (57) ABSTRACT

Slits 53, 53 are each formed in one pair of first opposite side portions 5a, 5b of a hinge body 5. By this, one pair of second opposite side portions 5c, 5d of the hinge body 5 can resiliently be deformed such that an interval between the second opposite side portions 5c, 5d varies. An outside interval W between the second opposite side portions 5c, 5d, at an opening end, of the hinge main body 5 is designed to be larger than an inside interval between one pair of opposite inner surfaces of a receiving hole 21a. By this, the one pair of second side portions 5c, 5d of the hinge main body 5 are press contacted with opposite inner surfaces of the receiving hole 21a.

2 Claims, 13 Drawing Sheets

HINGE ASSEMBLY WITH LIMITED PLAY

BACKGROUND OF THE INVENTION

This invention relates to a hinge assembly for pivotably connecting a device main body and an opening and closing member together, such as a telephone main body of a cellular telephone and its cover, a main body of a toilet and its seat, and the like.

In general, a hinge assembly of this type includes a sleeve-like hinge main body and a hinge shaft pivotably received in the hinge main body. The hinge main body is nonpivotably inserted in a receiving hole formed in a device main body. On the other hand, one end portion of the hinge shaft projects from the hinge main body and is nonpivotably connected to an opening and closing member. By this, the opening and closing member is pivotably connected to the device main body through the hinge assembly (see Japanese Patent Nos. 2,766,974 and 2,906,346).

In the case where the hinge assembly is used, for example, for a cellular telephone, a receiving hole is formed in a telephone main body as a device main body and the hinge assembly is received in this receiving hole. On the other hand, the hinge shaft is nonpivotably connected to a cover as an opening and closing member.

The telephone main body is normally formed of resin. Accordingly, the receiving hole is comparatively low in dimensional accuracy. For this reason, play tends to occur between the telephone main body and the hinge main body inserted in the receiving hole. As a result, the cover tends to rattle with respect to the telephone main body.

SUMMARY OF THE INVENTION

The present invention provides, in order to solve the above problem, a hinge assembly for pivotably connecting an opening and closing member to a device main body, the hinge assembly comprising a hinge main body nonpivotably received in a receiving hole formed in selected one of the device main body and the opening and closing member, and a hinge shaft pivotably supported by the hinge main body and nonpivotably connected to the other (the device main body or the opening and closing member), at least a part of the hinge main body being resiliently press contacted with an inner peripheral surface of the receiving hole so that no play occurs between the device main body and the hinge main body.

It is preferred that the hinge body is formed in a sleeve-like configuration, a slit is formed in each of one pair of first opposite side portions of the hinge main body such that the slit extends from one end of the hinge main body to the other end, thereby one pair of second opposite side portions of the hinge main body can resiliently be deformed towards and away from each other and the second opposite side portions are press contacted with the inner peripheral surface of the receiving hole by their own resiliency.

It is preferred that the hinge main body is formed in a sleeve-like configuration having a square configuration in section, the slit is formed in each of the one pair of first opposite side portions of the hinge main body, the one pair of second opposite side portions of the hinge main body can resiliently be deformed towards and away from each other and the one pair of second opposite side portions are press contacted with the inner peripheral surface of the receiving hole by their own resiliency.

It is preferred that a resilient member is disposed on each of one pair of first opposite side portions and the resilient members are press contacted with the inner peripheral surface of the receiving hole by their own resiliency.

It is preferred that a pivotal movement restricting portion is disposed on the hinge shaft, a resilient piece is disposed on the hinge main body such that the resilient piece is supported by the hinge main body in a cantilever fashion, the resilient piece restricting a pivotal position of the hinge shaft by a distal end portion of the resilient piece being resiliently press contacted with the pivotal movement restricting portion, and an intermediate portion of the resilient piece is press contacted with the hinge main body.

It is preferred that the intermediate portion of the resilient piece is press contacted with the hinge main body through a reinforcement resilient piece and a distal end portion of the reinforcement resilient piece is press contacted with the distal end portion of the resilient piece in order to increase a pressing force of the resilient piece with respect to the pivotal movement restricting portion.

BRIEF DESCRIPTION OF THE DRAWINGS

FIG. 8(A) is a front view thereof, FIG. 8(B) is a plan view thereof, FIG. 8(C) is a sectional view taken on line C—C of FIG. 8(A) and FIGS. 8(D) and 8(E) are views when viewed in the directions as indicated by arrows D and E of FIG. 8(A), respectively;

FIG. 9(A) is a perspective view showing a process for bending the hinge main body and FIG. 9(B) is a perspective view showing the hinge body after completion of the bending procedure;

FIG. 11(A) is a front view thereof, FIG. 11(B) is a plan view thereof, FIG. 11(C) is a sectional view taken on line C—C of FIG. 11 (A) and FIGS. 11(D) and 11(E) are views when viewed in the directions as indicated by arrows D and E of FIG. 11(A), respectively;

FIG. 12(A) shows a state in which a distal end portion of the hinge shaft is in abutment with a resilient piece, FIG. 12(B) shows another state in which the distal end portion of the hinge shaft is in engagement with a support hole formed in the hinge main body and FIG. 12(C) shows still another state in which the hinge shaft is further inserted into the hinge main body;

FIG. 13(A) shows a relation when the cover is pivoted to the closed position, FIG. 13(B) shows a relation when the cover is pivoted to a neutral position and FIG. 13(C) shows a relation when the cover is pivoted to the open position;

DETAILED DESCRIPTION OF THE EMBODIMENTS

Several embodiments of the present invention will now be described with reference to FIGS. 1 to 18.

Figure 1:
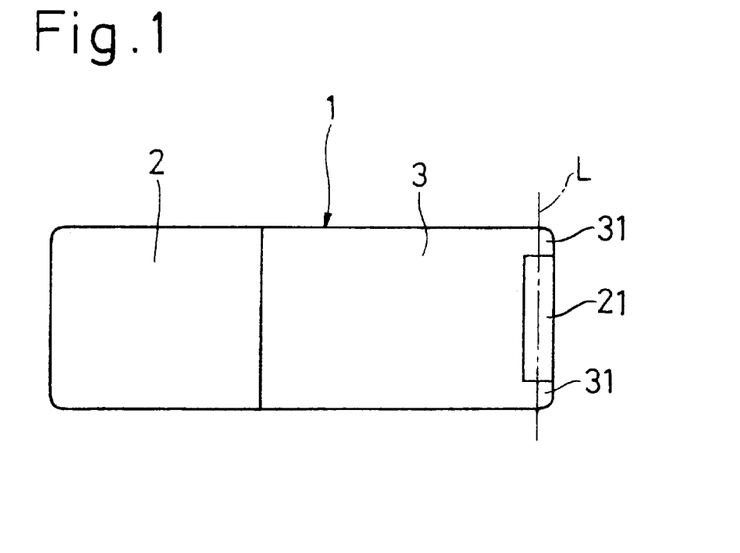
FIG. 1 is a plan view showing a cellular telephone in which a hinge assembly according to the present invention is used.
Figure 2:
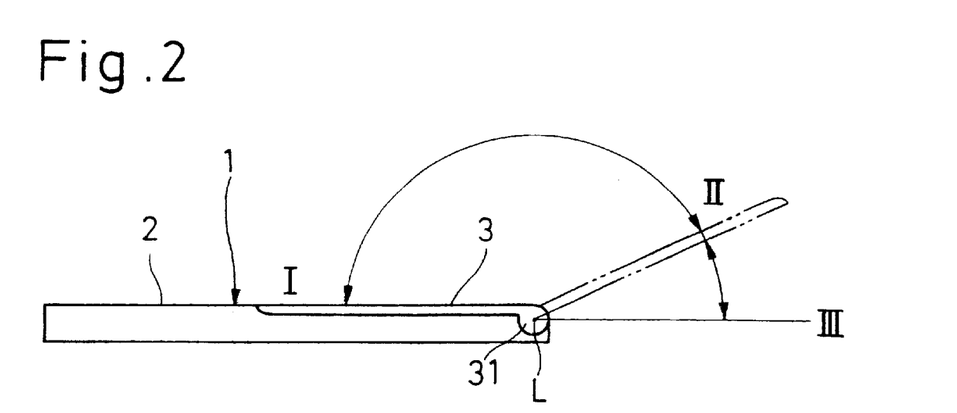
FIG. 2 is a front view of the cellular telephone.
Figure 3:
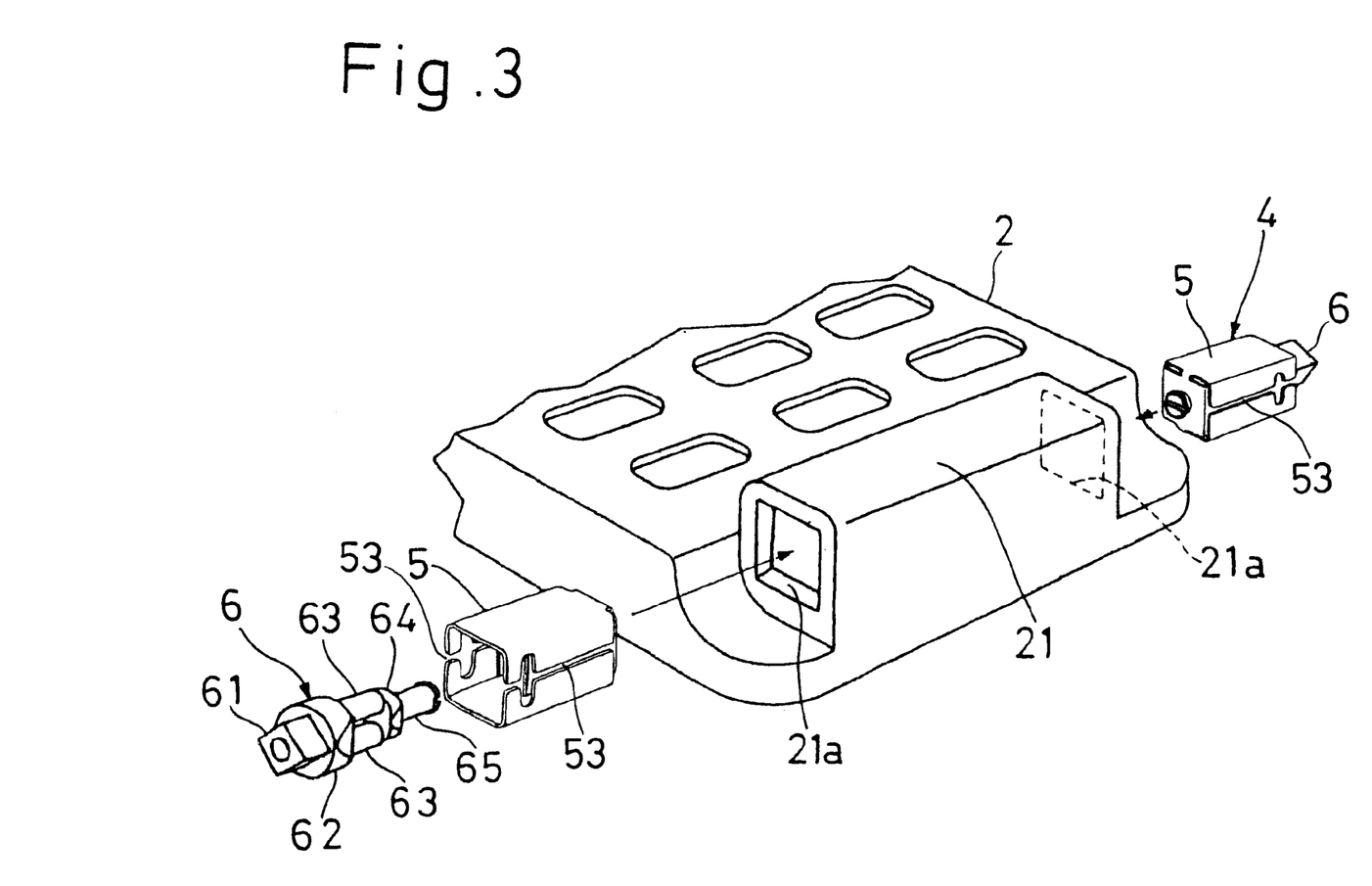
FIG. 3 is an exploded perspective view showing, on an enlarged basis, that end portion of the cellular telephone to which a cover of a telephone main body is attached and the hinge assembly according to the present invention.

FIGS. 1 and 2 show a cellular telephone 1 in which a hinge assembly according to the present invention is used. The cellular telephone 1 includes a telephone main body (device main body) 2 and a cover (opening and closing member) 3. The cover 3 is connected to the telephone main body 2 through a hinge assembly 4 (see FIGS. 3 to 7), as later described, such that the cover 3 can pivot about a pivot axis L. The cover 3 can pivot between a closed position I where the cover 3 hides various kinds of buttons (not shown) disposed on the telephone main body 2 and a fully open position III pivoted about 180 degrees from closed position I. The cover 3 is pivoted to an open position II during a speech.

Figure 4:
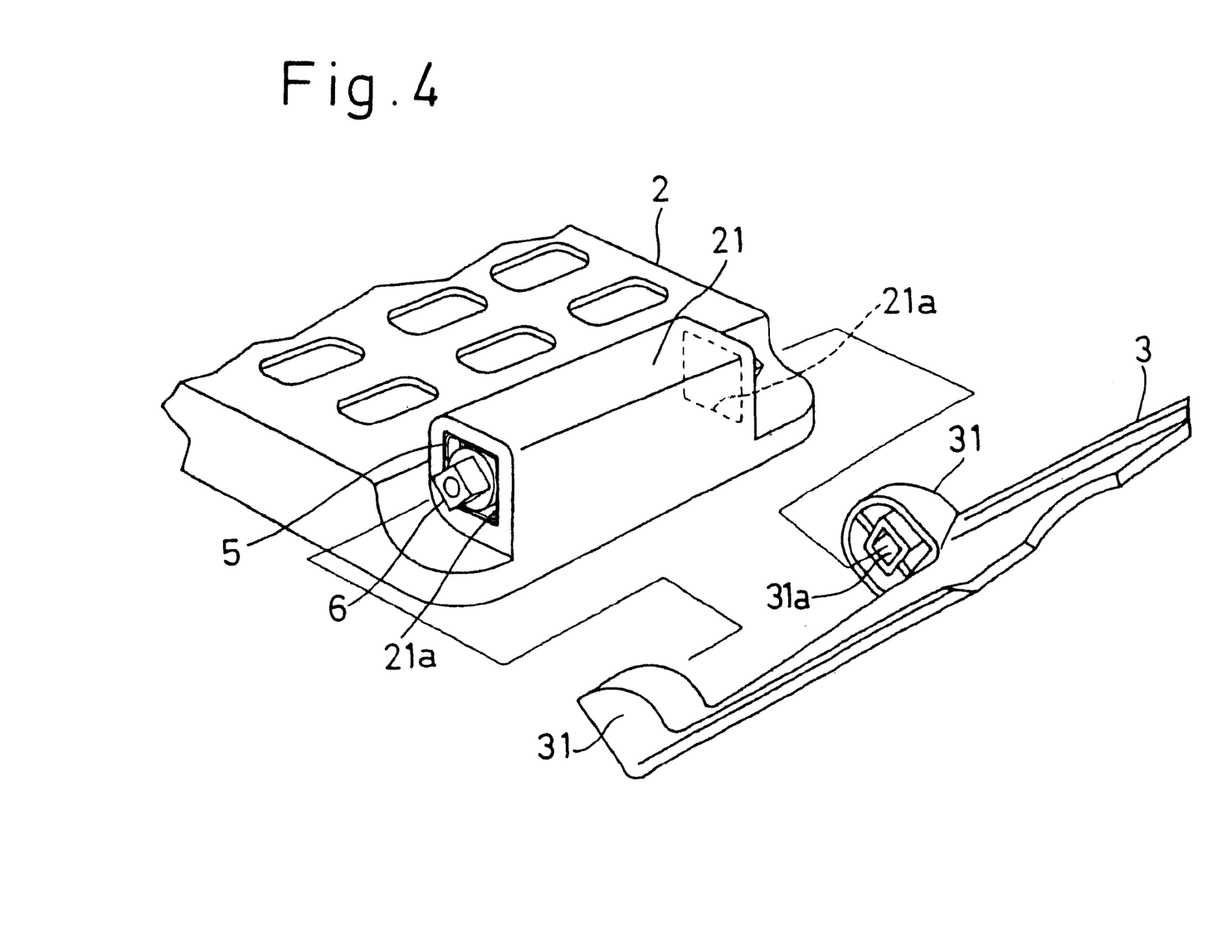
FIG. 4 is an exploded perspective view showing the telephone main body and the cover of the cellular telephone.
Figure 5:
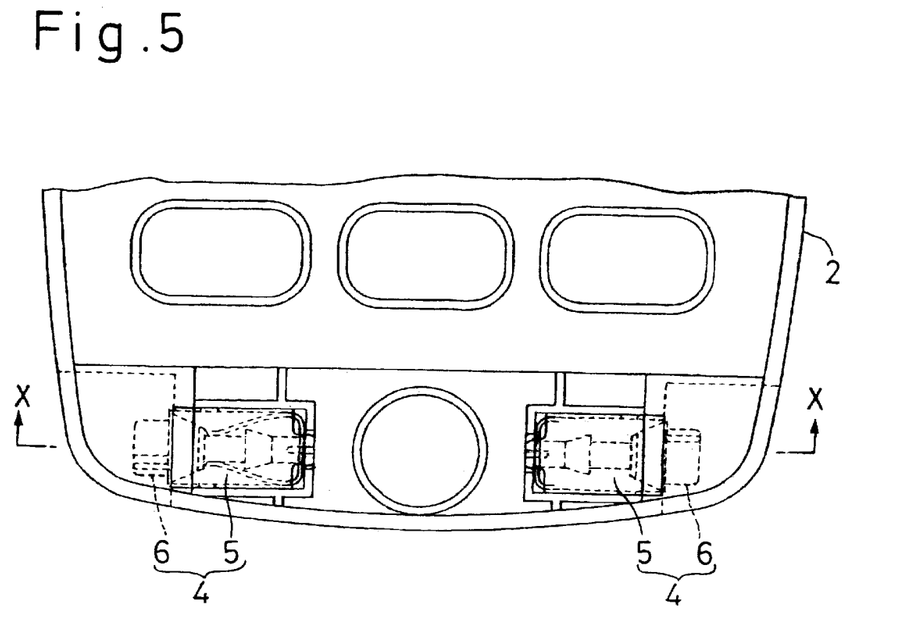
FIG. 5 is an enlarged view, when viewed from the back, showing that end portion of the telephone main body to which the cover of the cellular telephone is attached.
Figure 6:
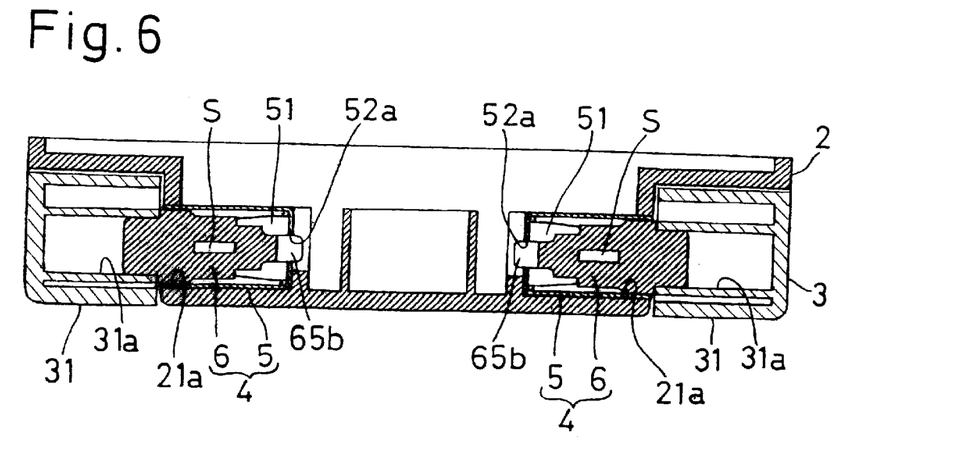
FIG. 6 is a sectional view taken on line X—X of FIG. 5.

As shown in FIGS. 3 to 6, an attachment portion 21 is formed on one end portion (right end portion of FIG. 1) of the telephone main body 2. The attachment portion 21 extends along the pivot axis L. Receiving holes 21a, 21a having a square configuration in section are formed in opposite end portions of the attachment portion 21, respectively. As shown in FIGS. 4 and 6, connecting protrusions 31, 31 are formed on opposite sides of one end portion of the cover 3, respectively. The connecting protrusions 31, 31 are arranged in such a manner as to confront opposite end faces of the attachment portion 21. An engagement hole 31a having a square configuration in section is formed in that surface, which confronts the attachment portion 21, of each connecting protrusion 31.

The hinge assembly 4, as shown in FIGS. 3 to 7, includes a hinge main body 5 and a hinge shaft 6. The hinge main body 5 is nonpivotably engaged with the receiving hole 21a with an axis thereof aligned with the pivot axis L. The hinge shaft 6 is pivotably received in the hinge main body 5 with its axis aligned with the axis of the hinge main body 5. One end portion of the hinge shaft 6 projects from the hinge main body 5 and is nonpivotably engaged with the engagement hole 31a of the cover 3. By this, the cover 3 is pivotably connected to the telephone main body 2 such that the cover 3 can pivot about the pivot axis L.

Figure 7:
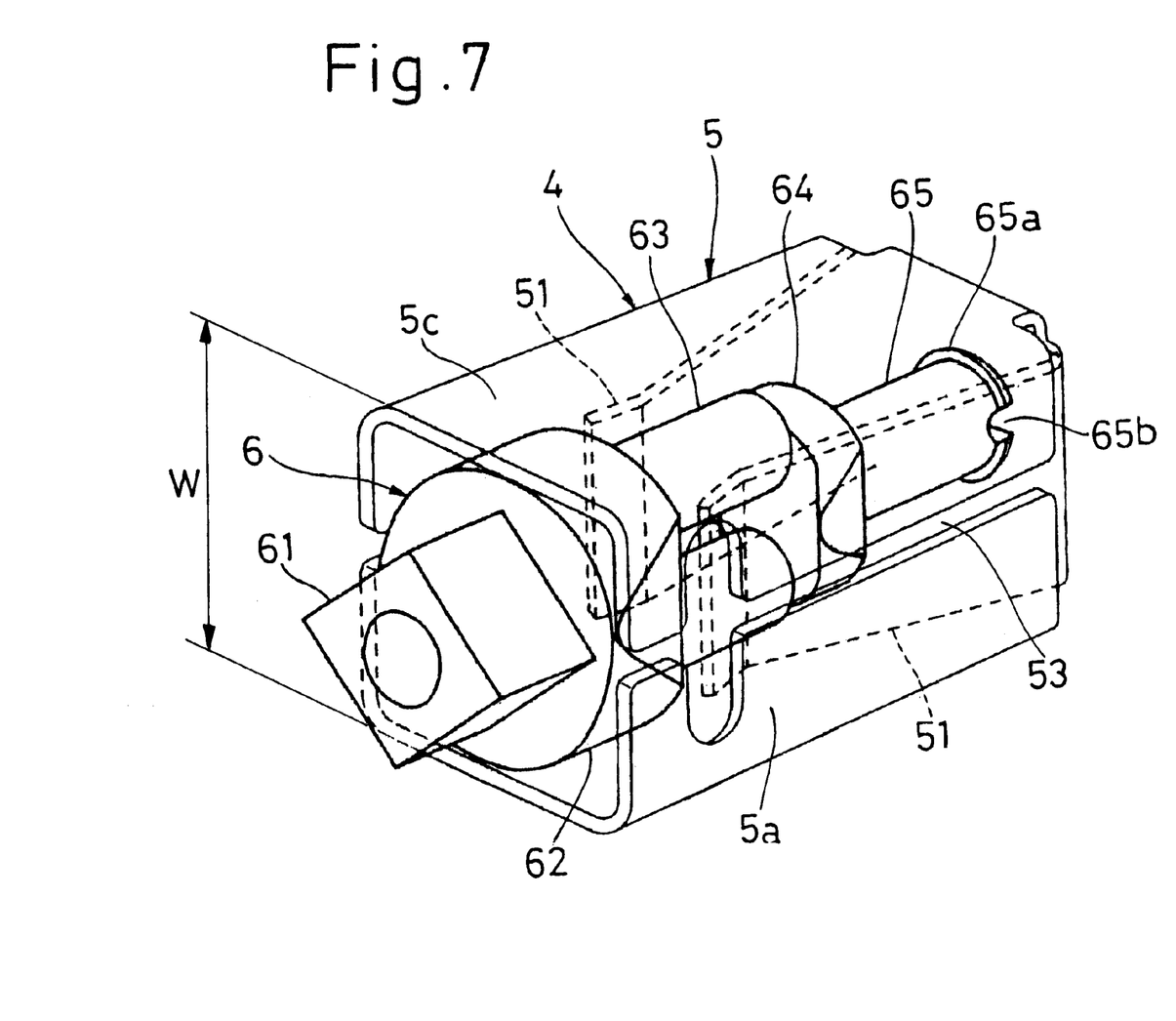
FIG. 7 is a protected perspective view showing a first embodiment of a hinge assembly according to the present invention.
Figure 9:
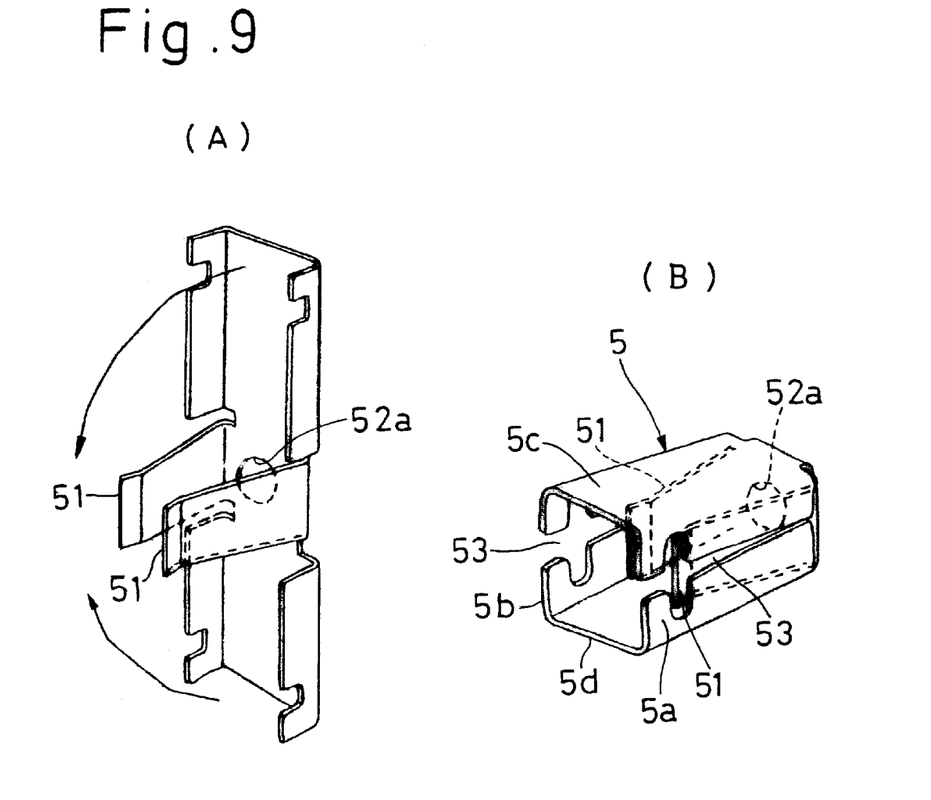
FIG. 9 is an illustration showing a manufacturing process of the hinge main body of the hinge assembly of FIG. 7.

The hinge main body 5 is formed by subjecting a metal plate to bend treatment. The hinge main body 5 is, as shown in FIGS. 7 and 9, formed in a sleeve-like configuration having a square configuration in section whose one end is open and the other end is closed to define a bottom portion 52. An outside interval between one pair of opposite side wall portions 5a, 5b of the hinge main body 5 is designed to be generally equal to an inside interval between one pair of opposite inner surfaces of the receiving hole 21a. Slits 53, 53 are formed in the one pair of first side wall portions 5a, 5b, respectively. The slits 53, 53 extend from an end face, on the opening side, of the hinge main body 5 towards the bottom portion 52 side. By this, one pair of second side wall portions 5c, 5d of the hinge main body 5 can resiliently be deformed in up and down directions of FIG. 9(B) about the bottom portion 52 side. Accordingly, the outside interval between the one pair of second side wall portions 5c, 5d can vary in such a manner as to be enlarged and reduced. An outside interval W (see FIG. 7), at the opening end of the hinge main body 5, between the second side wall portions 5c, 5d is designed to be larger than the inside interval, at the opening end, between one pair of opposite inner side surfaces of the receiving hole 21a.

The hinge main body 5 is inserted into the receiving hole 21a until its opening end portion comes to be flush with the end face of the attachment portion 21. Since the outside interval, at the opening end, between the one pair of second side wall portions 5c, 5d of the hinge main body 5 is larger than the inside interval between the one pair of opposite inner side surface of the receiving hole 21a, the one pair of second side wall portions 5c, 5d of the hinge main body 5 are inserted in the receiving hole 21a in a resiliently deformed state in which the outside interval is reduced. Accordingly, the one pair of second side walls 5c, 5d are pressed against the one pair of inner side surfaces of the receiving hole 21a by their own resiliency. By this, the hinge main body 5 is received in the receiving hole 21a without allowing the presence of play.

Although, in the hinge assembly 4 of this embodiment, the slits 53 are formed in the one pair of first opposite side wall portions 5a, 5b of the hinge main body 5 and only the one pair of second side wall portions 5c, 5d are press contacted with the one pair of inner side surfaces of the receiving hole 21a, it is also accepted that slits are formed in the one pair of second side wall portions 5c, 5d and all the side wall portions 5a to 5d are press contacted with the four inner side surfaces of the receiving hole 21a.

Figure 8:
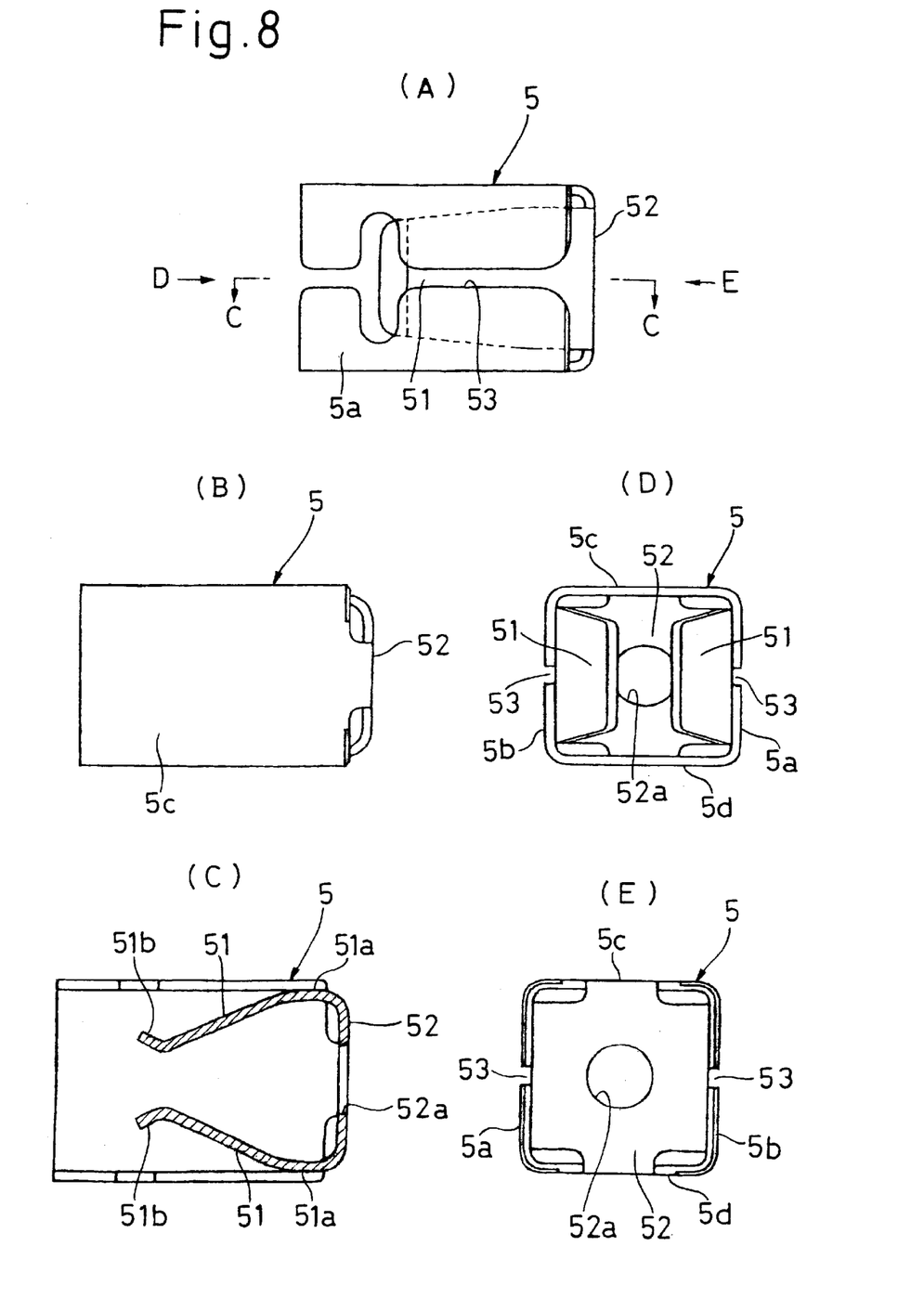
FIG. 8 is an illustration showing a hinge main body of the hinge assembly of FIG. 7.

As shown in FIGS. 8 and 9, the hinge main body 5 is provided with one pair of opposite resilient pieces 51, 51. One end portion of each resilient piece 51 is integrally connected to the bottom portion 52. Intermediate portions 51a, 51a of the resilient pieces 51 are press contacted with inner surfaces of the one pair of first opposite side wall portions 5a, 5b, respectively, by their own resiliency. The other end portion of each resilient piece 51 extends towards the opening portion side of the hinge main body 5. The resilient piece 51 is slanted inwardly of the hinge main body 5 as it goes towards the opening portion side. Accordingly, an interval between the resilient pieces 51, 51 is smaller at the opening portion side. It should be noted that a guide portion 51b is formed on a distal end portion of each resilient piece 51. The guide portion 5lb is slanted outward of the hinge main body 5 as it goes towards the opening portion side. Accordingly, an interval, at the distal end portions, between the resilient pieces 51, 51 is enlarged it goes towards the opening portion side.

Figure 10:
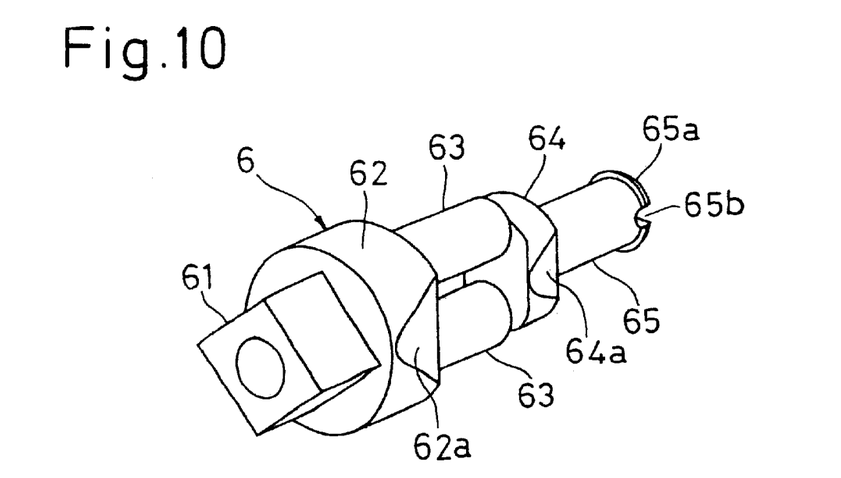
FIG. 10 is a perspective view showing a hinge shaft of the hinge assembly of FIG. 7.
Figure 11:
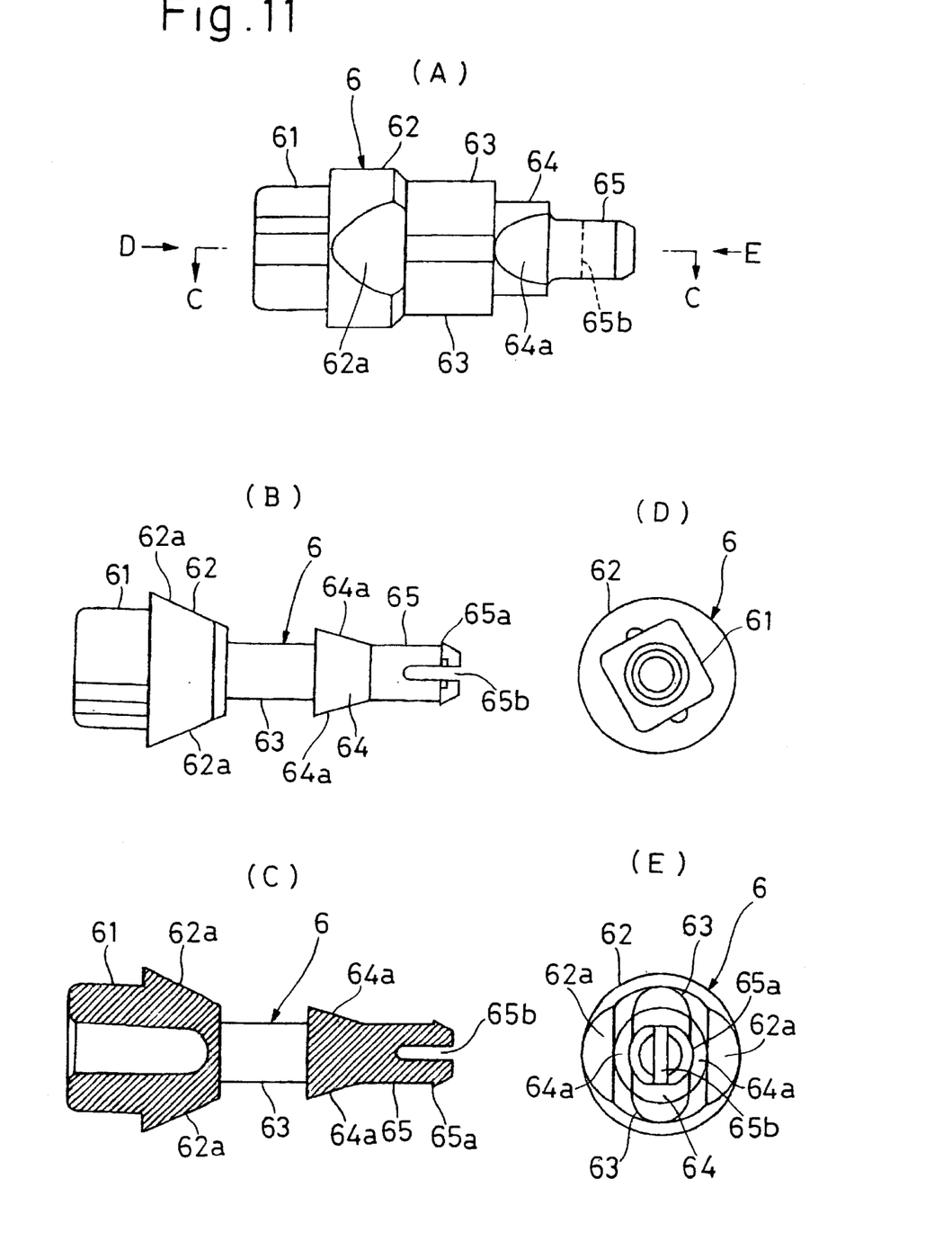
FIG. 11 is an illustration showing the hinge shaft.

The hinge shaft 6 is molded from resin. As shown in FIGS. 7, 10 and 11, the hinge shaft 6 is formed thereon with an engagement portion 61 having a square configuration in section. a substrate portion 62 having a circular configuration in section, two shaft portions (pivotal movement restricting portion) 63, 63 which are in parallel relation to each other and which have a circular configuration in section, a reinforcement plate portion 64 having an elliptical configuration in section and a connecting shaft portion 65 having a circular configuration in section, from one end side thereof to the other end side. The engagement portion 61, the substrate portion 62, the reinforcement plate portion 64 and the connecting shaft portion 65 are arranged such that their axes are in alignment and they are coaxial with the pivot axis L. An annular ridge portion 65a is formed on an outer periphery of a distal end portion of the connecting shaft portion 65. A slit 65b is formed in a central area of a distal end face of the connecting shaft portion 65. Owing to a provision of this slit 65b, the annular ridge portion 65a can resiliently be enlarged and reduced in diameter. The annular ridge portion 65a can be reduced in diameter until its outside diameter becomes smaller than the outside diameter of the connecting shaft portion 65.

The two shaft portions 63, 63 constitute the pivotal movement restricting portion. By being press contacted with the resilient pieces 51, 51 as later described, the two shaft portions 63, 63 restrict the pivotal position of the hinge shaft 6 and eventually restrict the pivotal position of the cover 3. The shaft portions 63, 63 are arranged in parallel with the pivot axis L and equidistantly away from the pivot axis L. A space S is formed between the two shaft portions 63, 63. Lubricating oil such as grease (not shown) is received in this space S. Three shaft portions 63, 63, 63 may be formed. Each shaft portion 63 may have a noncircular section. Instead of the plural shaft portions 63, 63 arranged away from each other, a cam portion as described in Japanese Patent No. 2,906,346 may be employed.

Figure 12:
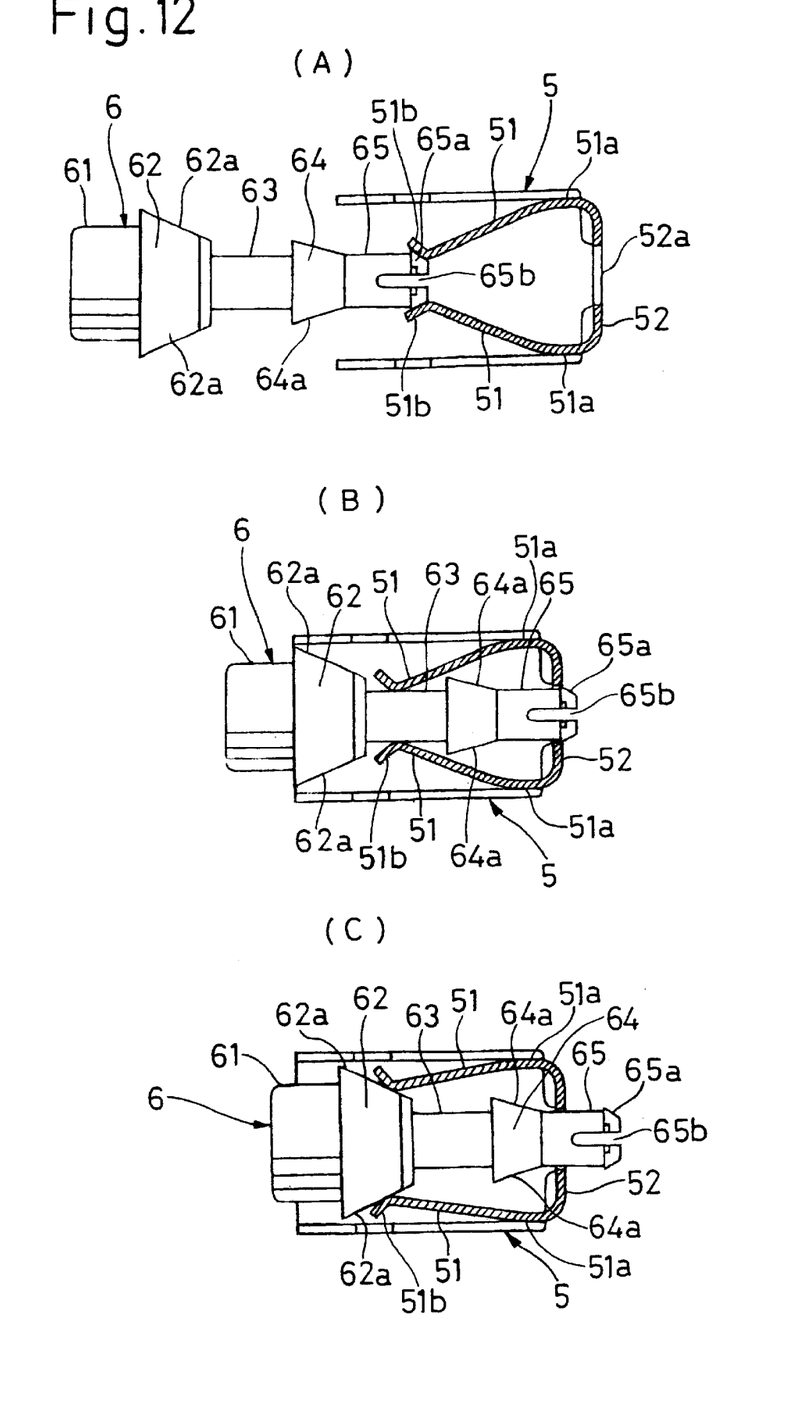
FIG. 12 is an illustration showing several states when the hinge main body is inserted into the hinge main body.

The hinge shaft 6 is inserted into the hinge main body 5 through the opening portion thereof in the following manner. As shown in FIG. 12(A), the attitude of the hinge shaft 6 is adjusted so that the opposing directions of the shaft portions 63, 63 of the hinge shaft 6 are brought into orthogonal relation to the opposing directions of the resilient pieces 51, 51 of the hinge main body 5. Subsequently, the hinge shaft 6 is inserted into the hinge main body 5 first with the connecting shaft portion 65 side. Then, as shown in FIG. 12(A), the annular ridge portion 65a is brought into abutment with the guide portions 51b, 51b of the resilient pieces 51, 51. When the hinge shaft 6 is inserted further into the hinge main body 5, the annular ridge portion 65a pushes and opens the two guide portions 51b, 51b so as to pass therethrough. Thereafter, when the hinge shaft 6 is inserted further into the hinge main body 5, the reinforcement plate portion 64 is brought into abutment with the guide portions 51b, 51b but it also passes therethrough in the same manner as just described. To assist the smooth passage, slanted surfaces 64a, 64a are formed on opposite side surfaces of the reinforcement plate portion 64.

When the hinge shaft 6 is inserted further into the hinge main body 5, the annular ridge 65a is brought into contact with an inner peripheral surface of a support hole 52a formed in a central area of the bottom portion 52 of the hinge main body 5 and reduced in diameter so as to pass therethrough. As a result, as shown in FIG. 12(B), the distal end portion of the connecting shaft portion 65 is pivotably engaged with the support hole 52a. In the state in which the connecting shaft portion 65 is engaged with the support hole 52a, the outer peripheral surface of the substrate portion 62 of the hinge shaft 6 is generally in contact with the inner surfaces of the four side portions of the hinge main body 5. By this, the hinge shaft 6 is coaxially engaged with the hinge main body 5 and pivotally connected thereto such that the hinge shaft 6 can pivot about the pivot axis L. The annular ridge 65a, which has passed through the support hole 52a, is enlarged in diameter and engaged with the bottom portion 52. By this, the hinge shaft 6 is prevented from escaping from the opening portion of the hinge main body 5.

In the state in which the connecting shaft portion 65 is in engaged with the support hole 52a, distal ends of the one pair of resilient pieces 51, 51, as shown in FIG. 12(B), are contacted with the shaft portions 63, 63 of the hinge shaft 6, respectively. By this, the pivotal position of the hinge shaft 6 is restricted. This will be described later in more detail. The engagement portion 61 of the hinge shaft 6 projects outside from the opening portion of the hinge main body 5. This engagement portion 61 is in engagement with the engagement hole 31a. By this, the cover 3 is pivotably connected to the telephone main body 2 through the hinge assembly 4.

The engagement of the engagement portion 61 with the engagement hole 31a can be achieved by the following manner. In the state of FIG. 12(B), the hinge shaft 6 is moved towards the bottom portion 52 side of the hinge main body 5. Then, as shown in FIG. 12(C), the slanted portions 51b, 51b of the resilient pieces 51, 51 are caused to climb up tapered surfaces 62a, 62a. This allows the hinge shaft 6 to move further towards the bottom portion 52 side. On the other hand, the hinge shaft 6 is pushed towards the opening portion side of the hinge main body 5 by the resilient pieces 51, 51. When the hinge shafts 6, 6 of the two hinge assemblies 4, 4 are entered into the hinge main bodies 5, 5, respectively, the attachment portion 21 of the telephone main body 2 is inserted between the connecting protrusions 31, 31 of the cover 3. And the engagement portions 61, 61 of the hinge shafts 6, 6 are brought into opposing relation to the engagement holes 31a, 31a, respectively. Then, the hinge shafts 6, 6 are pushed back by the biasing force of the resilient pieces 51, 51 and engaged with the engagement holes 31a, 31a, respectively. By this, the cover 3 is nonpivotably connected to the hinge shafts 6, 6 and pivotably connected to the telephone main body 2 through the hinge assemblies 4, 4.

Figure 13:
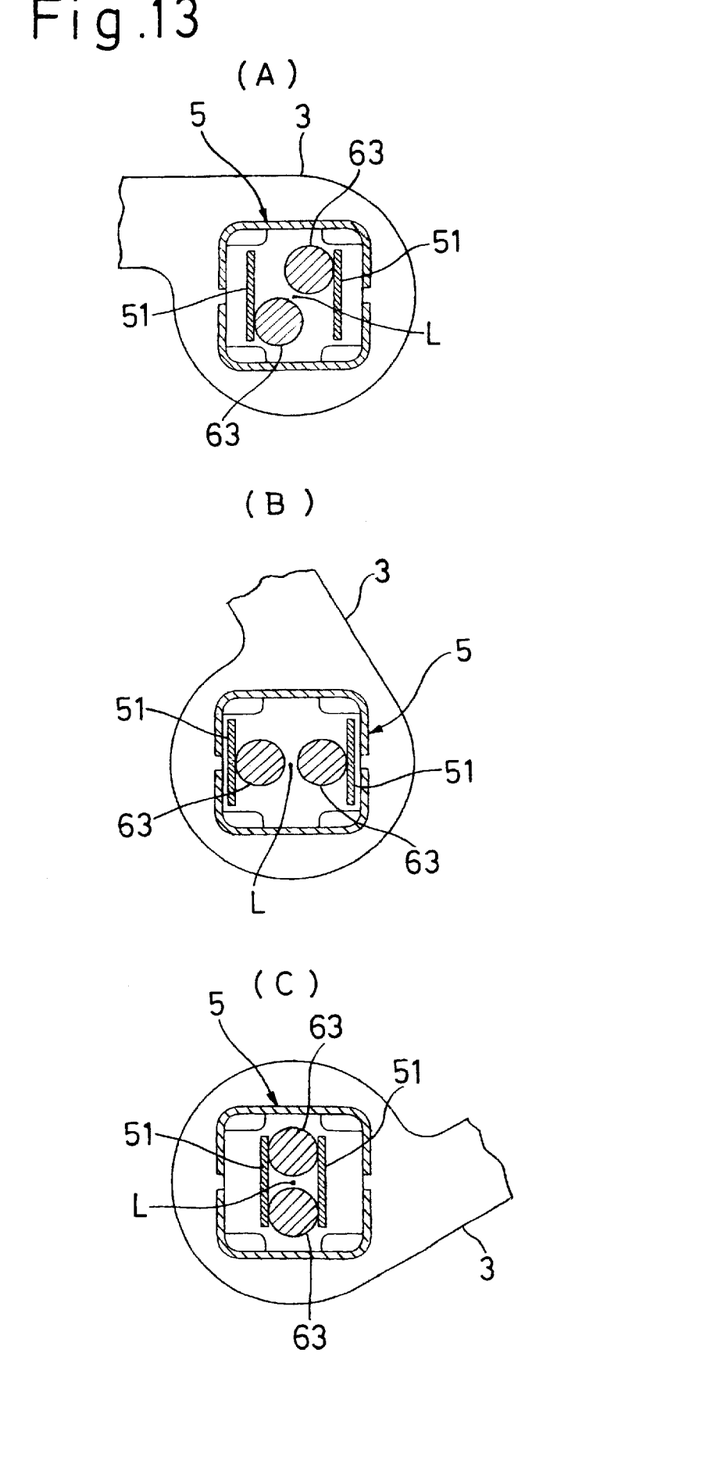
FIG. 13 is an illustration showing a relation between a resilient piece and a shaft portion of the hinge assembly of FIG. 7.

FIG. 13 is an illustration showing a relation between the two shaft portions 63, 63 and the resilient pieces 51, 51 with respect to the pivotal position of the cover 3. When the cover 3 is located in the closed position I of FIG. 2, the resilient pieces 51, 51 are, as shown in FIG. 13(A), in contact with the shaft portions 63, 63, respectively and bias the shaft portions 63, 63 in a counterclockwise direction of FIG. 13(A), respectively. Accordingly, the cover 3 is biased from the open position II side towards the closed position I side of FIG. 2 and brought into abutment with the telephone main body 2. Consequently, the cover 3 is held in the closed position I.

When the cover 3 located in the closed position I is pivoted about 60 degrees towards the open position II side against the biasing force of the resilient pieces 51, 51, the biasing force of the resilient pieces 51, 51 with respect to the shaft portions 63, 63, as shown in FIG. 13(B), act on a line orthogonal to the pivot axis L. As a result, the biasing force of the resilient pieces 51, 51 do not act as the pivotal biasing force with respect to the cover 3 and the cover 3 is restrained in a constant position (this position is hereinafter referred to as the "neutral position") by frictional resistance acting between the resilient piece 51 and the shaft portion 63. The neutral position may also be set to any other position than the position pivoted 60 degrees from the closed position I towards the open position II. When the cover 3 is pivoted, even if slightly, from the neutral position towards the closed position, the resilient pieces 51, 51 bias the cover 3 towards the closed position I side and causes the cover 3 to pivot to the closed position I. In contrast, when the cover 3 is pivoted, even if slightly, from the neutral position towards the open position II side, the resilient pieces 51, 51 bias the cover 3 towards the open position II side and cause the cover 3 to pivot to the open position II.

When the cover 3 is pivoted about 150 degrees from the closed position I, it reaches the open position II. In the open position II, as shown in FIG. 13(C), one 51 of the two resilient pieces is simultaneously press contacted with the two shaft portions 63, 63 from one side and the other resilient piece 51 is simultaneously press contacted with the two shaft portions 63, 63 from the other side. In other words, the resilient pieces 51, 51 simultaneously pinchingly hold the two shaft portions 63, 63. As a result, the cover 3 is held in the open position II. It is possible for the cover 3 to pivot from the open position II further to the fully open position III of FIG. 2. The cover 3 pivoted to any position between the open position II to the fully open position III is returned to the open position II by the resilient pieces 51, 51.

In the hinge assembly 1 thus constructed, the one pair of second side wall portions 5c, 5d of the hinge main body 5 are press contacted with the inner peripheral surface of the receiving hole 21a of the telephone main body 2 by their own resiliency. Accordingly, there can be prevented an occurrence of play between the hinge main body 5 and the inner peripheral surface of the receiving hole 21a. Accordingly, the cover 3 can be prevented from rattling with respect to the telephone main body 2.

When the cover 3 is pivoted, the interval between the one pair of resilient pieces 51, 51 varies. Accordingly, the amount of stress acting on the resilient piece 51 also varies. If this variation in stress acts on the connecting area between the resilient piece 51 and the bottom portion 52 repeatedly, crack occurs to the connecting area, thus resulting in a fear that the resilient piece 51 may be broken at that area. In this hinge assembly 4, however, since the intermediate portion 51a of the resilient piece 51 is press contacted with the inner surface of the hinge main body 5, the stress acting on the connecting area between the resilient piece 51 and the bottom portion 52 hardly varies. Accordingly, the resilient piece 51 can be prevented from being broken at the connecting area with respect to the bottom portion 52. Although the stress acts on the intermediate portion 51a of the resilient piece 51 repeatedly, the stress does not act on a limited small area concentrically. Instead, the stress is dispersed to the large area of the intermediate portion 51a. Accordingly, it rarely if ever happens that the resilient piece 51 is broken at the intermediate portion 51a at an early stage.

Further embodiments of the present invention will now be described. It should be noted that in the embodiments to be described hereinafter, only those parts of the construction different from the above embodiment are described and that like component parts are denoted by like reference numerals and description thereof is omitted.

Figure 14:
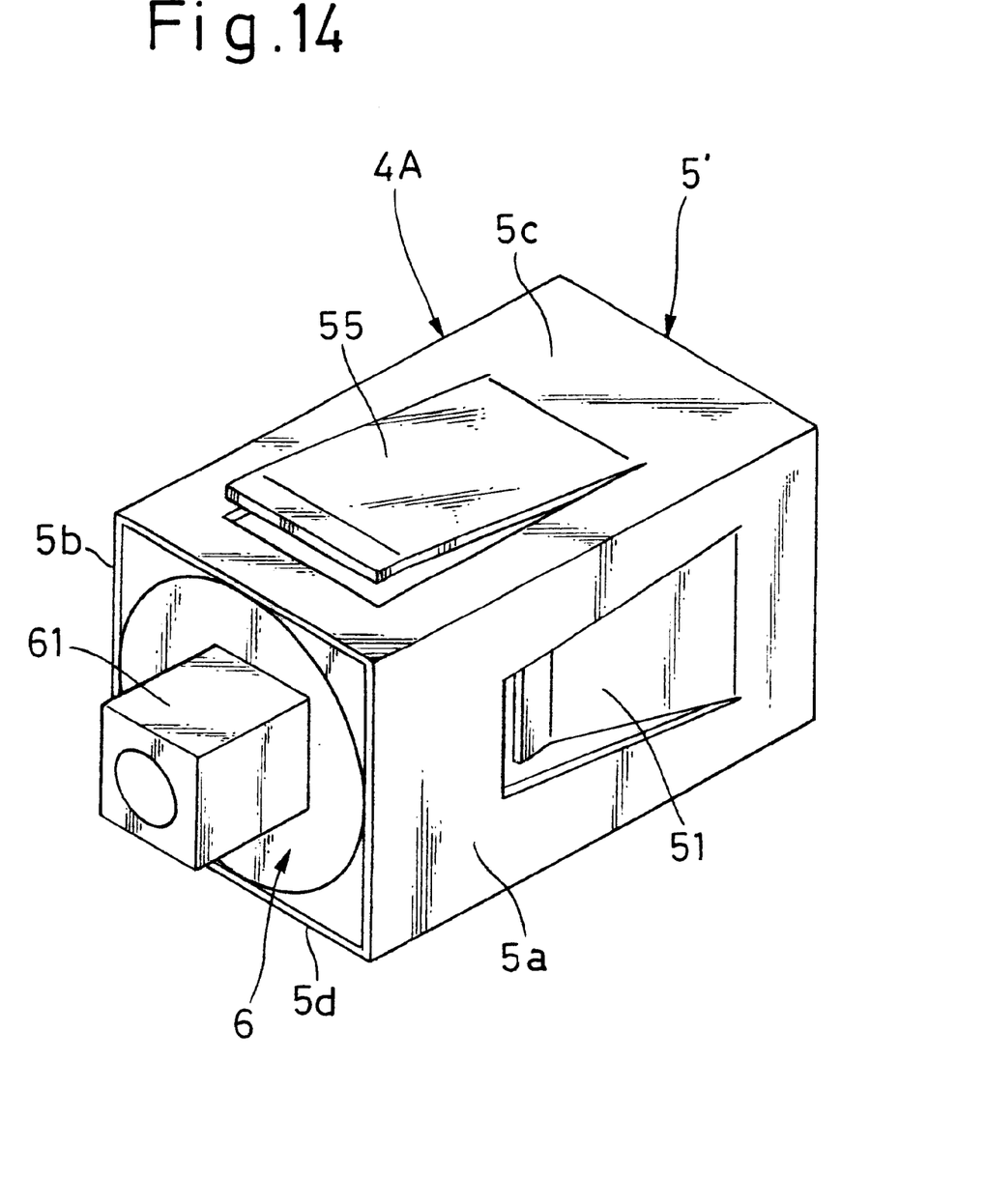
FIG. 14 is a perspective view showing a second embodiment of the present invention.

FIG. 14 shows a second embodiment of the present invention. In a hinge assembly 4A of this embodiment, a hinge main body 5' is used instead of the hinge main body 5. This hinge main body 5' is formed in a sleeve-like configuration with a bottom and having a square configuration in section by subjecting a metal plate to drawing treatment. An abutment portion (resilient member) 55 is formed on each of two opposite side wall portions 5a, 5b of all four side walls 5a to 5d by upwardly press working a part thereof towards the outside of the hinge main body 5'. The abutment portion 55 projects towards the outside of the hinge main body 5' as it goes from the bottom portion (not shown) side towards the opening portion side. The respective abutment plate portions 55 are press contacted with one pair of opposite inner surfaces of the receiving hole 21a by their own resiliency. By this, there can be prevented an occurrence of play between the hinge main body 5' and the receiving hole 21a. The one pair of second opposite side wall portions 5c, 5d are each formed with a resilient piece 51 which is formed by upwardly press working a part of the second opposite side wall portions 5c, 5d towards the inside of the hinge main body 5.

Figure 15:
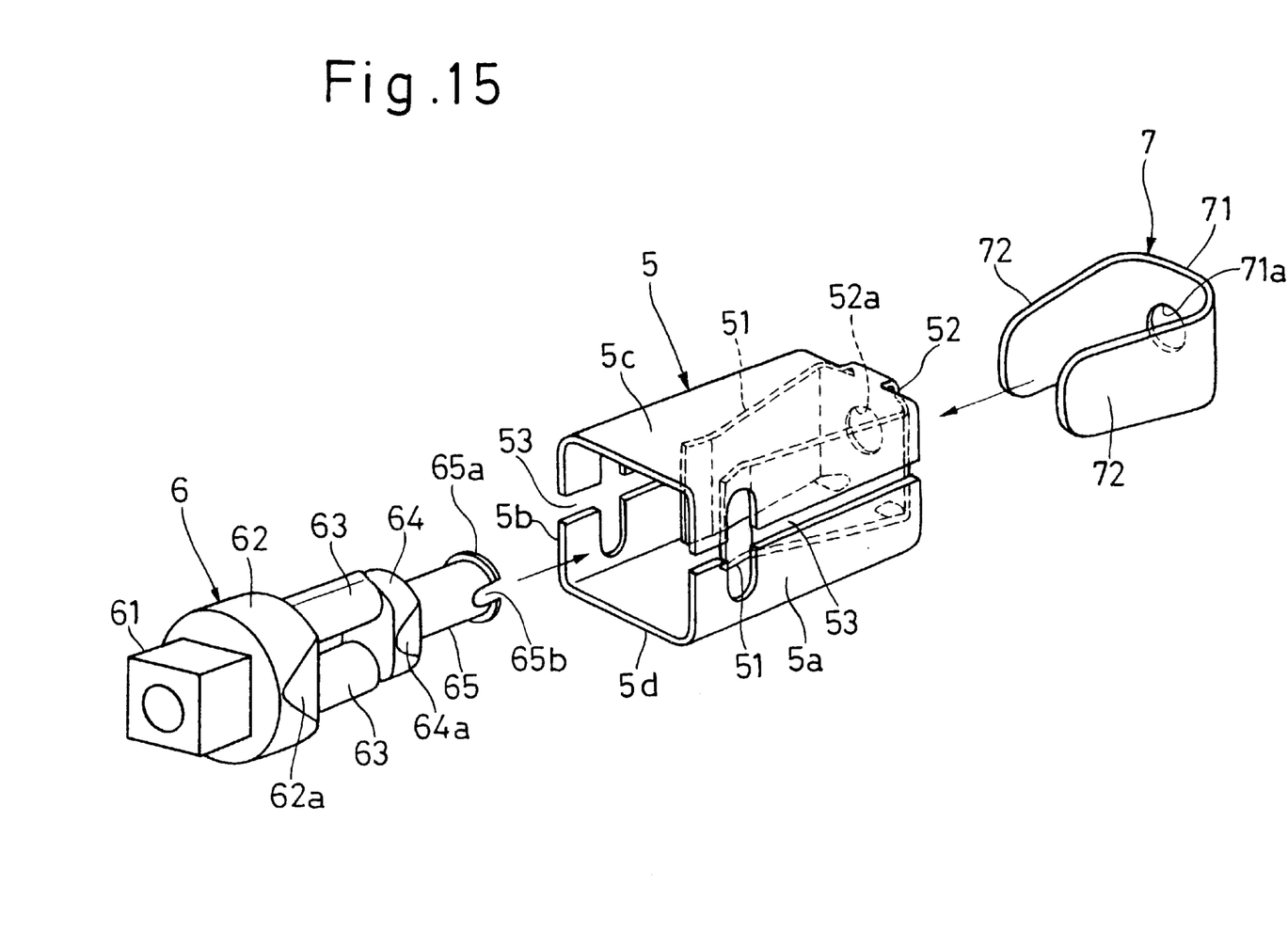
FIG. 15 is an exploded perspective view showing a third embodiment of the present invention.
Figure 16:
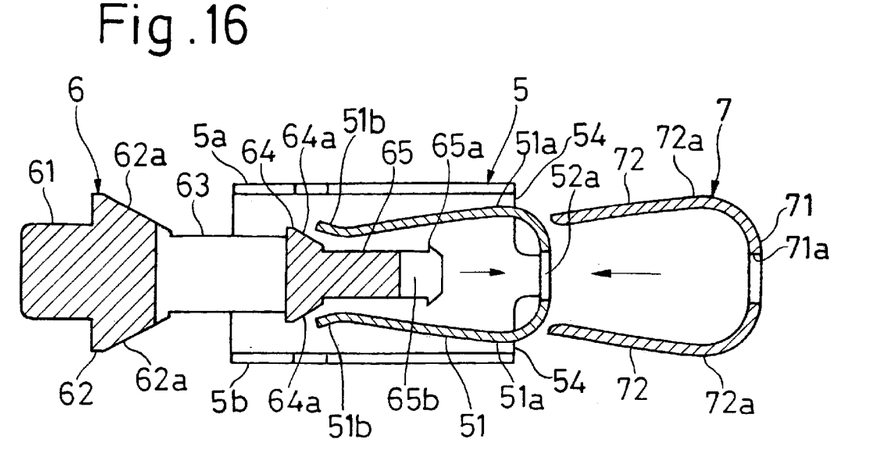
FIG. 16 is a sectional view showing the above embodiment but before it is assembled.
Figure 17:
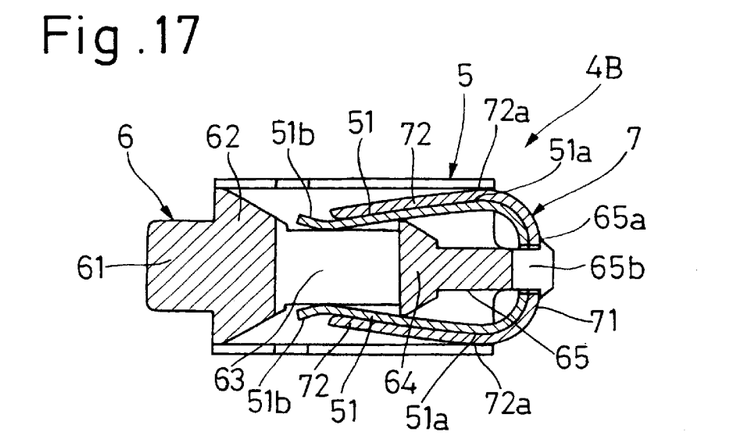
FIG. 17 is a sectional view showing the above embodiment but after it is assembled.

FIGS. 15 to 17 show a third embodiment of the present invention. In a hinge assembly 4B of this embodiment, a reinforcement resilient piece 7 is used. The reinforcement resilient piece 7 is formed in a generally U-shaped configuration. It includes a substrate portion 71 and one pair of reinforcement plate portions 72, 72 projecting from opposite end portions of the substrate portion 71 in the same direction. A through-hole 71a is formed in a central area of the substrate portion 71. The substrate portion 71 is brought into abutment with a bottom portion 52 and engaged with an annular ridge 65a which has passed through the through-hole 71a. By doing so, the substrate portion 71 is attached to the hinge main body 5. The reinforcement plate portions 72, 72 are inserted into the hinge main body 5 via spaces 54, 54 formed between the resilient pieces 51, 51 and the side wall portions 5a, 5b of the hinge main body 5 which are in opposing relation to the resilient pieces 51, 51. Outer surface portions of intermediate portions 72a, 72a of the reinforcement plate portions 72, 72 are press contacted with inner surfaces of the side wall portions 5a, 5b of the hinge main body 5, while inner surface portions of the intermediate portions 72a, 72a are press contacted with the intermediate portions 51a, 51a of the resilient pieces 51, 51. Accordingly, the resilient pieces 51, 51 are press contacted with the side wall portions 5a, 5b of the hinge main body 5 through the reinforcement plate portions 72, 72. A distal end portion of each reinforcement plate portion 72 is contacted with a distal end portion of each resilient piece 51 so as to press the resilient piece 51 towards the inside of the hinge main body 5. Accordingly, the resilient piece 51 pivotally biases the shaft portion 63 by its own resiliency and by the resiliency of the reinforcement plate portion 72. Accordingly, the pivotal biasing force with respect to the cover 3 can be increased to that extent of the resiliency of the reinforcement resilient piece 7.

Figure 18:
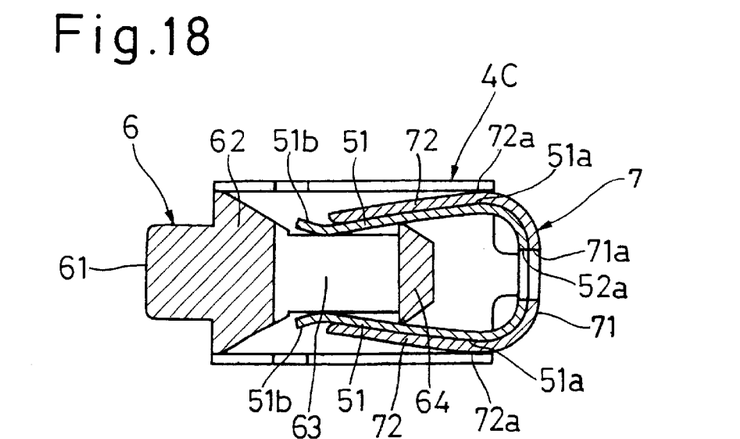
FIG. 18 is a sectional view showing a fourth embodiment of the present invention.

FIG. 18 shows a fourth embodiment of the present invention. A hinge assembly 4C of this embodiment is a modification of the hinge assembly 4B shown in FIGS. 15 to 17. In the hinge assembly 4C, the hinge shaft 6 is not provided with the connecting shaft portion 65. Accordingly, there is no such an arrangement that the hinge shaft 6 and the reinforcement resilient piece 7 are prevented from escaping by the annular ridge 65a. The hinge shaft 6 is prevented from escaping from the hinge main body 5 by the reinforcement plate portion 64 in contact with the resilient piece 51. The reinforcement piece 7 is prevented from escaping from the hinge main body 5 by the distal end portions of the reinforcement plate portions 72, 72 being press contacted with the resilient pieces 51, 51 respectively and inner and outer surface portions of the intermediate portion 72a of each reinforcement plate portion 72 being press contacted with the inner surface of the side wall portion of the hinge main body 5 and the intermediate portion 51a of the resilient piece 51 respectively.

It should be noted that the present invention is not limited to the above embodiments and many changes and modifications can be made in accordance with necessity.

For example, the hinge assemblies 4 to 4C according to the present invention can be applied not only between the telephone main body 2 and the cover 3 of the cellular telephone 1 but also between a toilet seat (device main body) of a toilet and its cover (opening and closing member).

Although the receiving hole 21a for receiving therein the hinge main body 5 is formed in the telephone main body 2 and the hinge shaft 5 is nonpivotably connected to the cover 3, it is also accepted that the receiving hole is formed in the cover 3 and the hinge shaft 6 is nonpivotably connected to the telephone main body 2.

What is claimed is:

1. A hinge assembly for pivotably connecting an opening and closing member to a device main body, said hinge assembly comprising a hinge main body nonpivotably received in a receiving hole formed in a selected one of said device main body and said opening and closing member, and a hinge shaft pivotably supported by said hinge main body and nonpivotably connected to the other of said device main body or said opening and closing member, at least a part of said hinge main body being resiliently press contacted with an inner peripheral surface of said receiving hole by its own resiliency so that play is prevented between said device main body and said opening and closing member.

2. A hinge assembly according to claim 1, wherein said intermediate portion of said resilient piece is press contacted with said hinge main body through a reinforcement resilient piece and a distal end portion of said reinforcement resilient piece is press contacted with the distal end portion of said resilient piece in order to increase a pressing force of said resilient piece with respect to said pivotal movement restricting portion.

\* \* \* \* \*

UNITED STATES PATENT AND TRADEMARK OFFICE
CERTIFICATE OF CORRECTION

PATENT NO.    : 6,523,224 B1
DATED         : February 25, 2003
INVENTOR(S)   : Kazuyoshi Oshima and Katsuya Imai It is certified that error appears in the above-identified patent and that said Letters Patent is hereby corrected as shown below:

<u>Column 10,</u>
Line 3, delete the entire paragraph "at least a part of said hinge main body being resiliently press contacted with an inner peripheral surface of said receiving hole by its own resiliency so that play is prevented between said device main body and said opening and closing member" and insert therefore:

--said hinge main body having one pair of first opposite side portions and another pair of second opposite side portions arranged in a sleeve-like configuration having a square configuration in cross section, a slit is formed in each of said pair of first opposite side portions of said hinge main body such that said slit extends from one end of said hinge main body to the other end, thereby said pair of second opposite side portions of said hinge main body can resiliently be deformed such that distal ends of said pair of second opposite side portions move towards and away from each other, said second opposite side portions are press contacted with the inner peripheral surface of said receiving hole by their own resiliency so that play is prevented between said device main body and said opening and closing member, a pivotal movement restricting portion is disposed on said hinge shaft, a resilient piece is disposed on said hinge main body such that said resilient piece is supported by said hinge main body in a cantilever fashion, said resilient piece restricting a pivotal position of said hinge shaft by a distal end portion of said resilient piece being resiliently press contacted with said pivotal movement restricting portion, and an intermediate portion of said resilient piece is press contacted with said hinge main body.--

Signed and Sealed this

Twenty-third Day of September, 2003

JAMES E. ROGAN
*Director of the United States Patent and Trademark Office*